(12) United States Patent
Huang

(10) Patent No.: US 10,502,396 B2
(45) Date of Patent: Dec. 10, 2019

(54) PROJECTING SPOTLIGHT

(71) Applicant: Rongshen Huang, Foshan (CN)

(72) Inventor: Rongshen Huang, Foshan (CN)

(*) Notice: Subject to any disclaimer, the term of this patent is extended or adjusted under 35 U.S.C. 154(b) by 206 days.

(21) Appl. No.: 15/863,649

(22) Filed: Jan. 5, 2018

(65) Prior Publication Data

US 2018/0187866 A1    Jul. 5, 2018

Related U.S. Application Data

(63) Continuation-in-part of application No. 15/742,374, filed as application No. PCT/CN2016/088295 on Jul. 4, 2016.

(60) Provisional application No. 62/448,132, filed on Jan. 19, 2017.

(30) Foreign Application Priority Data

Dec. 16, 2015 (CN) ...................... 2015 2 1054995 U

(51) Int. Cl.
| | |
|---|---|
| *F21V 14/06* | (2006.01) |
| *F21L 4/00* | (2006.01) |
| *F21V 13/02* | (2006.01) |
| *F21V 17/02* | (2006.01) |
| *G02B 27/20* | (2006.01) |
| *G02B 27/30* | (2006.01) |
| *F21V 5/00* | (2018.01) |
| *F21V 5/04* | (2006.01) |
| *G02B 19/00* | (2006.01) |
| *G02B 7/02* | (2006.01) |

(52) U.S. Cl.
CPC .............. *F21V 14/065* (2013.01); *F21L 4/00* (2013.01); *F21V 5/006* (2013.01); *F21V 5/008* (2013.01); *F21V 5/048* (2013.01); *F21V 13/02* (2013.01); *F21V 17/02* (2013.01); *G02B 19/0014* (2013.01); *G02B 19/0047* (2013.01); *G02B 27/20* (2013.01); *G02B 27/30* (2013.01); *G02B 7/021* (2013.01)

(58) Field of Classification Search
CPC ........... H01M 6/32; H01M 4/38; H01M 4/624
See application file for complete search history.

(56) References Cited

U.S. PATENT DOCUMENTS

| | | | | |
|---|---|---|---|---|
| 6,741,404 B2* | 5/2004 | Ue | ......................... | G02B 7/021 |
| | | | | 359/811 |
| 2006/0034075 A1* | 2/2006 | Alessio | .................... | F21L 4/005 |
| | | | | 362/202 |
| 2010/0027251 A1* | 2/2010 | Shpizel | ................... | F21L 4/005 |
| | | | | 362/187 |
| 2011/0267823 A1* | 11/2011 | Angelini | ................. | F21L 4/027 |
| | | | | 362/277 |

* cited by examiner

*Primary Examiner* — Evan P Dzierzynski
(74) *Attorney, Agent, or Firm* — Eric B. Fugett; Mark A. Pitchford; Pitchford Fugett, PLLC

(57) ABSTRACT

Systems and methods for projecting a collimated beam of light from one or more light sources.

31 Claims, 12 Drawing Sheets

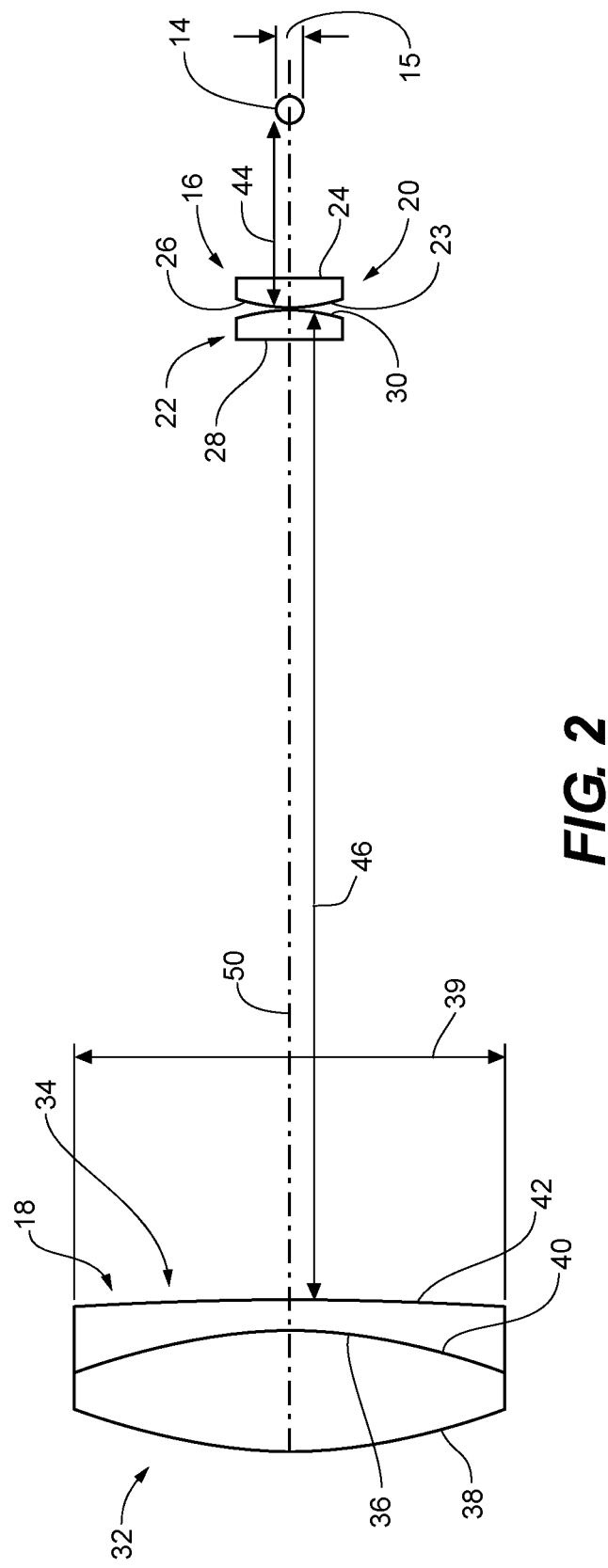

PROJECTING SPOTLIGHT

CROSS-REFERENCE TO RELATED APPLICATIONS

This application is a continuation-in-part (CIP) of U.S. patent application Ser. No. 15/742,374 filed Jan. 5, 2018, which is a national stage application under 35 U.S.C. 371 ("371 Application") of PCT Patent Application No. PCT/CN2016/088295 filed Jul. 4, 2016, which is a PCT application of Chinese Patent Application No. 201521054995.6 filed Dec. 16, 2015, now Chinese Patent No. CN 205244904 U issued May 18, 2016, and this application claims the benefit of U.S. Provisional Patent Application No. 62/448,132 filed Jan. 19, 2017, which are herein incorporated by reference in their entirety.

STATEMENT REGARDING FEDERALLY SPONSORED RESEARCH OR DEVELOPMENT

Not applicable.

TECHNICAL FIELD

The disclosure relates to a system for projecting a collimated beam of light from a light source. More specifically, the disclosure pertains to projecting a collimated beam of light using a light emitting diode as a light source.

BACKGROUND

A typical prior art flashlight includes a battery, a light bulb and a reflector surrounding the light bulb to provide a pattern of light projected on a target object, and glass in front of the reflector. Generally, such flashlights are non-focusable and are non-adjustable in lighting range and brightness. The light pattern provided by such an arrangement is usually uneven in brightness with on and off-axis bright spots. The uneven brightness and on and off-axis bright spots are caused by imperfections in the surface of the reflector. Inconsistent light patterns are lower in overall light intensity which hampers the identification of the target object to be viewed. As a result, they typically fail to meet the working demand under some situations.

In some flashlights, the intensity of the light produced by the flashlight may be varied by moving the position of the light bulb relative to the position of the stationary reflector, thereby focusing the light between a wide beam or a narrow beam. Accordingly, some prior art flashlights include a lens in front of the reflector. The reflector and the lens are intended to collect light from the source and collimate or focus the light into a desired beam. Such light sources generally produce a diverging beam of light whereby the brightness varies across the beam. Typically, the light beam is brightest at its center, and drops off dramatically at its peripheral edge. Examples of such prior art lights may be found in U.S. Pat. Nos. 1,823,762, 2,228,078, 4,286,311, and 4,527,223.

Flashlights having a light emitting diode (LED) as the light source rather than a conventional incandescent light bulb are becoming commonplace. The LED however cannot be easily moved relative to the reflector to change the intensity.

Collimators are well known in the optical arts, and typically include a plurality of lens or reflectors that act upon light to emit nearly parallel rays. Such collimators are generally used in, for example, searchlights, headlamps and light projectors. A typical example of a light projector designed to emit a collimated beam can be found in U.S. Pat. No. 5,918,968 to Choi, which provides a parabolic reflector for converting light emitted from a lamp to parallel rays, a biconvex lens for collimating both direct and reflected light from the light source, a combination lens having a first lens and a second lens for focusing the collimated light from the biconvex lens to a focal point, and an image lens located beyond the focal point for converting the light focused at the focal point into a parallel beam.

U.S. Pat. No. 6,827,475, to Vetorino et al., combines a plurality of lens and reflectors to collimate light that includes a conical reflector disposed about the base of an LED and a lens specially designed to focus the collected light into a nearly collimated beam. The lens have opposite, substantially elliptical surfaces that collect and collimate the rapidly diverging light from the LED and the reflector. Vetorino et al., however, do not provide for the compression of the collimated beam.

Chinese patent CN201210090919.5 discloses a focus-variable flashlight having an LED light source, a moving lens, a fixed lens, a focusing cover, a cylinder body, a steel ball, a spring and the like. Both the fixed lens and the moving lens are arranged in a manner of being perpendicular to an optic axis in front of the LED light source. A constant distance is kept between the fixed lens and the LED light source, and the moving lens is capable of moving back and forth in relation to the LED light source. The lighting area and brightness of exit light can be regulated by changing the distance between the moving lens and the LED light source. This flashlight, though capable of zooming, has a relatively complex structure. The moving lens is arranged on a moving lens holder, a light transmitting lens also needs to be arranged on the head ring of the lamp cap, and during zooming, movement of the moving lens holder is driven by rotation of the focusing cover, which indispensably leads to arrangement, inside the flashlight, of a hollow cavity used for back-and-forth movement of the moving lens holder. Consequently, the flashlight has to be large in length, and becomes difficult to carry and store. Furthermore, the complex mechanism not only results in troublesome manufacturing and high cost, but is also problematic to maintenance.

U.S. Pat. Nos. 7,461,945 and 8,147,088 disclose LED flashlights incorporating a separate lens that can be moved relative to the LED to vary the intensity by changing the focus. For example, U.S. Pat. No. 7,461,945 discloses a focus-adjustable LED flashlight comprising a tubular housing; an LED light-emitting unit coupled to the tubular housing; a sleeve unit coupled movably to the tubular housing; and a positive lens mounted in the sleeve unit and spaced apart from and aligned with the light-emitting unit along an axis of the tubular housing. The sleeve unit is movable relative to the tubular housing and the light-emitting unit along the axis of the tubular housing so as to adjust a distance between the positive lens and the light-emitting unit. Specifically, the positive lens is disclosed as a plano-convex lens because such lenses show minimum spherical aberration when oriented with its plane surface facing the light source. This is in contrast to a usual symmetric convex singlet or a reversed plano-convex lens.

However, there continues to be a need for a flashlight providing a focusable high intensity collimated beam having a pronounced illuminated field with minimal halo therearound.

SUMMARY

A non-limiting exemplary embodiment of a system for projecting a collimated beam of light includes a housing, a first set of lenses, a projection lens, a light source, and an energy source for the light source. The first set of lenses includes a first and a second plano-convex lens. The first plano-convex lens includes a first substantially planar surface and a first convex surface. The second plano-convex lens includes a second substantially planar surface and a second convex surface. In certain embodiments, the first and the second plano-convex lenses are disposed with the first and the second convex surfaces face each other. The projection lens includes a plano-concave lens and a bi-convex lens. The plano-concave lens includes a third substantially planar surface and a concave surface. The bi-convex lens includes a third and a fourth convex surface. In some embodiments, the concave surface and the third convex surface are disposed facing each other. The light source is disposed facing the first substantially planar surface. At least the first set of lenses, the projection lens and the light source are disposed within the housing. The extent of the collimation of the beam of light exiting the projection lens is adjustable.

A non-limiting exemplary embodiment of a method of collimating a beam of light from a light source includes providing a system having a first set of lenses, a projection lens, a light source, and an energy source for the light source. The first set of lenses includes a first plano-convex lens having a first substantially planar surface and a first convex surface, and a second plano-convex lens having a second substantially planar surface and a second convex surface, wherein the first and the second convex surfaces face each other. The projection lens includes a plano-concave lens having a third substantially planar surface and a concave surface, and a bi-convex lens having a third and a fourth convex surface, wherein the concave surface and the third convex surface face each other. The second plano-convex lens and the projection lens are disposed with their respective substantially planar surface facing each other, the light source is disposed facing the first substantially planar surface, and the first and the second plano-convex lenses, the projection lens, and the light source are substantially aligned along a common optical axis. The method includes energizing the light source, projecting the light from the light source exiting the projection lens onto a target, and adjusting a distance between one or more of: the first plano-convex lens and the light source, the light source and an aperture defined at least in part by the first set of lenses, the first and the second plano-convex lenses, the plano-concave lens and the bi-convex lens, and projection lens and the aperture.

BRIEF DESCRIPTION OF THE DRAWINGS

FIG. 2 illustrates the relative positioning of the key elements in the system of FIG. 1;

DETAILED DESCRIPTION

One or more non-limiting exemplary embodiments are described herein with reference to the accompanying drawings, wherein like elements are designated by like numerals. While multiple exemplary embodiments are disclosed, variations thereof will become apparent or obvious to a person having ordinary skill in the art. It should be clearly understood that there is no intent, implied or otherwise, to limit the disclosure to the illustrated and described embodiments. Accordingly, any and all variants of the disclosed embodiments are considered as being within the metes and bounds of the instant disclosure.

Figure 1A:
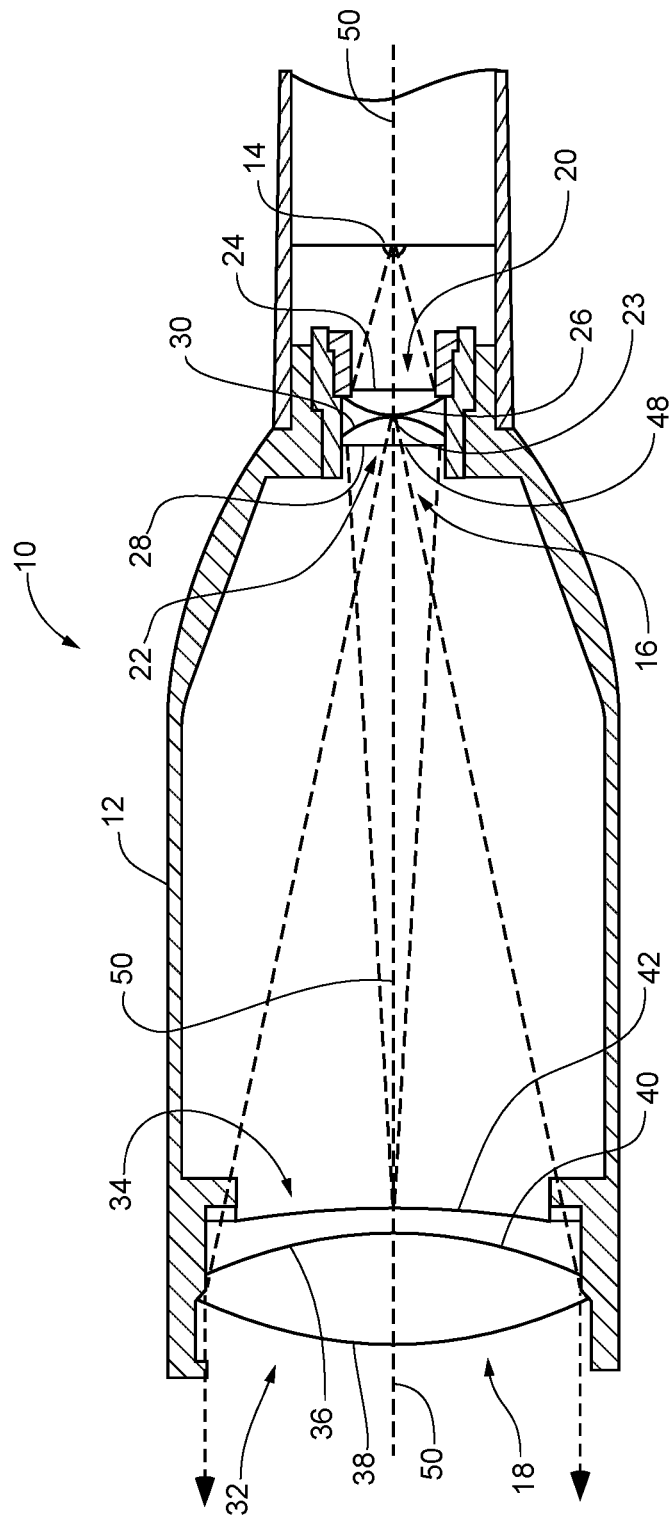
FIG. 1A is a cross-sectional view of a non-limiting exemplary embodiment of a system for projecting a collimated beam of light.
Figure 1B:
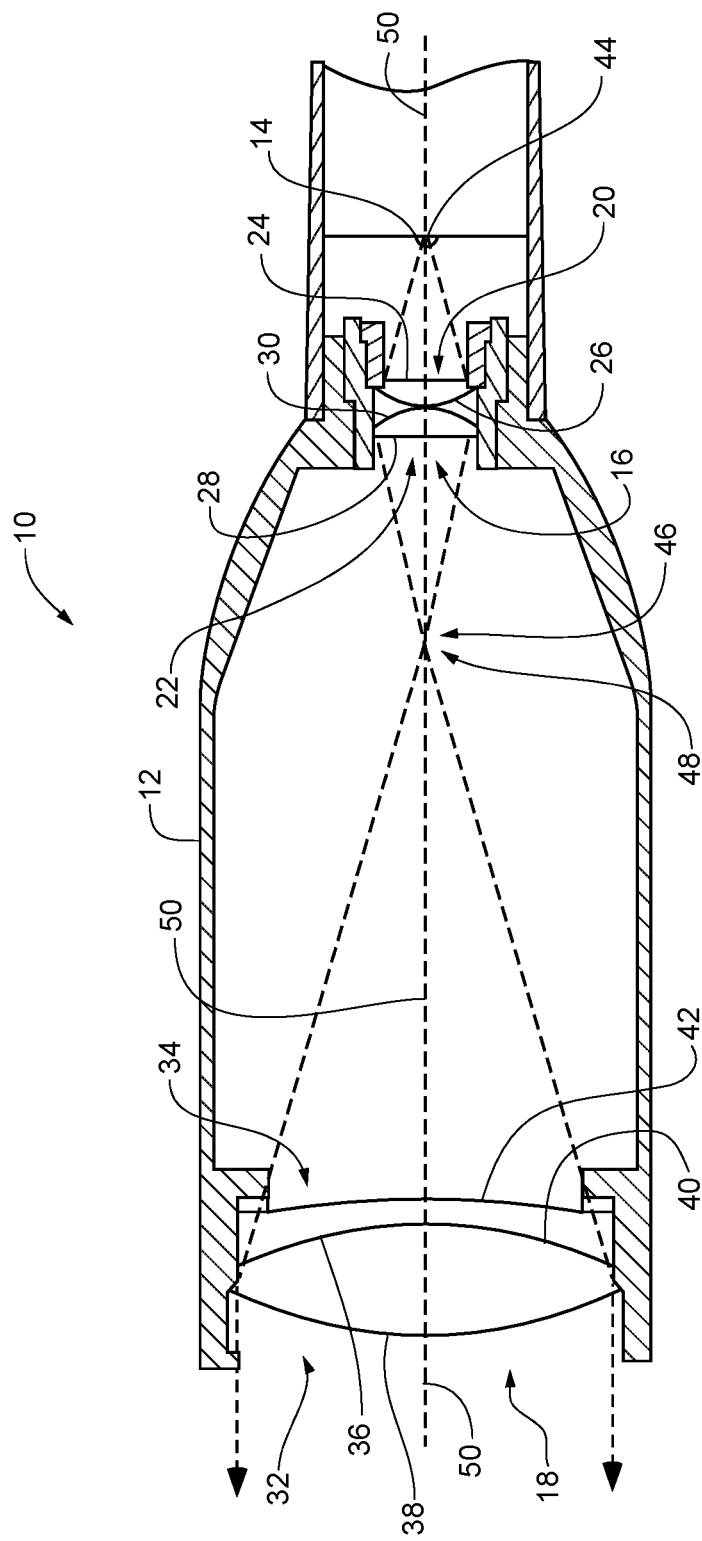
FIG. 1B is a cross-sectional view of another non-limiting exemplary embodiment of a system for projecting a collimated beam of light.

FIGS. 1A and 1B illustrate a non-limiting exemplary embodiment of a system 10 for projecting or providing a collimated beam of light. The system 10 includes a housing 12, a light source 14, a first set of lenses 16 having an aperture 23, and a projecting lens 18. The light source 14, the first set of lenses 16, and the projection lens 18 are disposed within the housing 12. The system 10 will generally include an energy or power source (not shown) and an on/off switch or push button (not shown) for the light source 14.

In some embodiments, the light source 14 is a light emitting diode (LED) as is well known in the art. In certain embodiments, the LED is an infra-red (IR) LED. In some embodiments, the light source 14 is a laser as is also well known in the art. In certain embodiments, the laser light source 14 emits a diffused laser beam. In some embodiments, the light source 14 is a filament configured to emit light as a point source or diffusively.

In some embodiments, the first set of lenses 16 includes a first and a second plano-convex lens 20 and 22. Because plano-convex lenses are well known in the art, a detailed description of their structure and properties is considered redundant, and therefore not repeated herein. The first plano-convex lens 20 is defined at least in part by a first substantially planar surface 24 and a first convex surface 26. Likewise, the second plano-convex lens 22 is defined at least in part by a second substantially planar surface 28 and a second convex surface 30. In a non-limiting exemplary embodiment, the first and the second plano-convex lenses 20 and 22 are disposed along a common optical axis 50 with their respective first and second convex surfaces 26 and 30 facing each other. In some embodiments, the first and the second plano-convex lenses 20 and 22 are disposed with their respective first and second convex surfaces 26 and 30 in contact with each other at their respective vertices. In certain embodiments, the first and the second plano-convex lenses 20 and 22 are disposed with their respective first and the second convex surfaces 26 and 30 spaced apart from each other. In some embodiments, a distance between the first and the second plano-convex lenses 20 and 22, and more specifically a distance between the convex surfaces 26 and 30, is adjustable. In certain embodiments, the first and the second plano-convex lenses 20 and 22 have substantially similar indices of refraction. In some embodiments, the first and the second plano-convex lenses 20 and 22 have dissimilar indices of refraction.

In a non-limiting exemplary embodiment, the first and the second plano-convex lenses 20 and 22 have substantially similar diameters. As such, the diameter of the aperture 23 will be substantially equal to the diameters of the first and the second plano-convex lenses 20 and 22.

Projection lens 18 are also well known in the art. Therefore, a detailed description of their structure and properties is considered redundant, and not repeated herein. In a non-limiting exemplary embodiment of system 10, the projection lens 18 is a doublet defined at least in part by a bi-convex lens 32 and a plano-concave lens 34. As is well known in the art, the bi-convex lens 32 is defined at least in part by third and fourth convex surfaces 36 and 38. In some embodiments, the plano-concave lens 34, as is well known in the art, includes a concave surface 40 and a third substantially planar surface 42. In certain embodiments, the surface 42 is planar. In some embodiments, the third substantially planar surface 42 has a relatively small curvature such that the surface 42 is somewhat convex, but "appears" to be "planar". Accordingly, in certain embodiments, the plano-concave lens 34 is a concave-convex (i.e., negative meniscus) lens defined at least in part by the concave surface 40 and a convex surface represented by the third substantially planar surface 42.

In some embodiments, the projection lens 18 is not a combination of the bi-convex lens 32 and the plano-concave lens 34. In a non-limiting exemplary embodiment, the projection lens 18 is a plano-convex lens defined at least in part by the fourth convex surface 38 and the third substantially planar surface 42. In some embodiments, the surface 42 is planar. In certain embodiments, the third substantially planar surface 42 has a relatively small curvature such that the surface 42 is somewhat convex, but "appears" to be "planar". In a non-limiting exemplary embodiment, the projection lens 18 is a bi-convex lens defined at least in part by the fourth convex surface 38 and a somewhat convex surface defined by the third substantially planar surface 42. In some embodiments, the surface 42 is a convex surface. In certain embodiments, the projection lens 18 is an achromatic doublet as is well known in the art.

In some embodiments, the projection lens 18 is configured as a doublet wherein the bi-convex lens 32 and the plano-concave lens 34 are aligned along a common optical axis 50 and are in contact with each other along their respective convex and concave surfaces 36 and 40. In certain embodiments, the bi-convex lens 32 and the plano-concave lens 34 are affixed (or attached, adhered) to each other along at least a portion of their respective convex and concave surfaces 36 and 40. In some embodiments, the bi-convex lens 32 and the plano-concave lens 34 are aligned with their respective convex and concave surfaces 36 and 40 spaced apart from each other. In certain embodiments, a distance between the lenses 32 and 34, and more specifically a distance between their respective convex and concave surfaces 36 and 40, is adjustable. In some embodiments, the bi-convex lens 32 and the plano-concave lens 34 have substantially similar indices of refraction. In certain embodiments, the lenses 32 and 34 have dissimilar indices of refraction.

In a non-limiting exemplary embodiment, the first set of lenses 16 having the aperture 23 and defined at least in part by the two plano-convex lenses 20 and 22 will have a positive optical power. In a non-limiting exemplary embodiment, light directed towards the first set of lenses 16 from a point source 14 will be imaged by the first set of lenses 16 onto a position between the first set of lenses 16 and the projection lens 18. In some embodiments, the light from the light source 14 will be imaged or projected by the first set of lenses 16 onto the projection lens 18. In certain embodiments, the light imaged or projected onto the projection lens 18 will have a diameter substantially equal to the diameter of the projection lens 18.

In a non-limiting exemplary embodiment, the projection lens 18 is configured as an imaging lens. In some embodiments, the projection lens 18 will collimate the light directed towards the third substantially planar surface 42 from the first set of lenses 16. That is, the system 10 will provide a collimated beam of light exiting through the fourth convex surface 38.

FIG. 2 illustrates the relative positioning of the key elements in a non-limiting exemplary embodiment of the system 10 illustrated in FIG. 1. In some embodiments, the light source 14, the first set of lenses 16 and the projection lens 18 are disposed within the housing 12 along a common optical axis 50. In the embodiment illustrated in FIG. 2, the first and the second plano-convex lenses 20 and 22 of the first set of lenses 16 have substantially similar diameters and are in contact with each other at their respective vertices. As such, the aperture 23 of the first set of lenses 16 will have a diameter substantially similar to the diameters of the first and the second plano-convex lenses 20 and 22. In FIG. 2, the light source 14 is illustrated as having a diameter 15, and the projection lens 18 is illustrated as having a diameter 39. In a non-limiting exemplary embodiment, the light source 14 and the aperture 23 of the first set of lenses are spaced apart by a distance 44, and the aperture 23 and the third substantially planar surface 42 of the projection lens 18 are spaced apart by the distance 46. In some embodiments, the ratio of the diameter 15 of the light source 14 to the diameter 39 of the projection lens 18 is substantially equal to the ratio of the distance 44 to the distance 46.

In some embodiments, a first focal point of the first set of lenses 16 will be located between the light source 14 and the first set of lenses 16. In certain embodiments, the first focal length will be substantially equal to the distance 44 between the light source 14 and the aperture 23. In some embodiments, the first focal length will be less than the distance 44 between the light source 14 and the aperture 23. In certain embodiments, a second focal point of the first set of lenses 16 will be located between the first set of lenses 16 and the projection lens 18. In some embodiments, the second focal length will be substantially equal to the distance 46 between the aperture 23 and the third substantially planar surface 42 of the projection lens 18. In certain embodiments, the second focal length will be less than the distance 46 between the aperture 23 and the third substantially planar surface 42 of the projection lens 18. In some embodiments, the first and the second focal lengths of the first set of lenses 16 are substantially equal. In certain embodiments, the first and the second focal lengths of the first set of lenses 16 are not equal. In some embodiments, the reciprocal of each of the first and the second focal lengths of the first set of lenses 16 is substantially equal to the sum of the reciprocal of the distance 44 and the reciprocal of the distance 46.

In certain embodiments, a third focal point of the projection lens 18 will be located between the third substantially planar surface 42 of the projection lens 18 and the aperture 23 of the first set of lenses 16. In some embodiments, the third focal point of the projection lens 18 will be substantially equal to the distance 46 between the third substantially planar surface 42 and the aperture 23. In certain embodiments, the third focal point of the projection lens 18 will be less than the distance 46 between the third substantially planar surface 42 and the aperture 23.

In a non-limiting exemplary embodiment, the first and the second focal points of the first set of lenses and the third focal point of the projection lens 18 are aligned along the common optical axis 50. In some embodiments, the light source 14 is located on, or aligned with, the common optical axis 50.

In certain embodiments, the distance 46 between aperture 23 of the first set of lenses 16 and the third substantially planar surface 42 of the projection lens 18 is substantially fixed and not adjustable. As such, the locations of the second focal point of the first set of lenses 16 and the third focal point of the projection lens 18 will be substantially fixed and not adjustable. In some embodiments, the third focal point of the projection lens 18 is located on the optical axis 50 at the aperture 23 of the first set of lenses 16. In certain embodiments, the second focal point of the first set of lenses 16 is located on the common optical axis at the surface of the third substantially planar surface 42 of the projection lens 18. In some embodiment, the second focal point of the first set of lenses 16 and the third focal point of the projection lens 18 are substantially coincident with each other. In certain embodiments, the distance 46 between the aperture 23 of the first set of lenses 16 and the third substantially planar surface 42 of the projection lens 18 is adjustable along the common optical axis 50. As such, the locations of the second focal point of the first set of lenses 16 and the third focal point of the projection lens 18 will be adjustable. Consequently, the sharpness of the region illuminated by the collimated light exiting the projection lens 18, i.e., exiting through the fourth convex surface 38, will be adjustable. Accordingly, in some embodiments, the extent of the collimation, i.e., the sharpness of the illuminated field and/or the extent of a halo around the illuminated field will be adjustable as a function of the distance between the second focal point of the first set of lenses 16 and the third focal point of the projection lens 18. In some embodiments, when the distance 46 is adjusted such that the second focal point of the first set of lenses 16 and the third focal point of the projection lens 18 substantially coincide with each other, the light exiting the fourth convex surface 38 of the projection lens 18 will be highly collimated with minimal halo around the illuminated field. In contrast, when the second focal point of the first set of lenses 16 and the third focal point of the projection lens 18 do not coincide with each other, the light exiting the projection lens 18 will be somewhat collimated with a halo around the illuminated field.

In certain embodiments, the extent of the collimation, i.e., the sharpness of the illuminated field and/or the extent of the halo therearound, will be a function of the respective indices of refraction of the first set of lenses 16 and the projection lens 18. In particular, the extent of the collimation will be a function of the respective indices of refraction of one or more of the first and the second plano-convex lenses 20 and 22, the bi-convex lens 32, and the plano-concave lens 34. In some embodiments, the extent of the collimation will be a function of both the distance between the second focal point of the first set of lenses 16 and the third focal point of the projection lens 18 and the respective indices of refraction of one or more of the first and the second plano-convex lenses 20 and 22, the bi-convex lens 32, and the plano-concave lens 34. The operational consequences of such optical positioning and/or optical properties on the extent of the collimation, i.e., the extent of the sharpness of the illuminated field and/or the extent of the halo therearound will be readily apparent to one skilled in the art.

It will be readily apparent to one skilled in the art that the first and second focal lengths of the first set of lenses 16 will be a function of the effective refractive index of the first set of lenses 16. In embodiments wherein the first set of lenses includes the first and the second plano-convex lenses 20 and 22, the first and the second focal lengths will be a function of the respective indices of refraction of the first and the second plano-convex lenses 20 and 22, and the distance between the vertices of the first and second convex surfaces 26 and 30. Likewise, it will be readily apparent to one skilled in the art that the third focal length of the projection lens 18 will be a function of the effective index of refraction of the projection lens 18. In embodiments wherein the projection lens 18 includes the bi-convex lens 32 and the plano-concave lens 34, the third focal length of the projection lens 18 will be a function of the respective indices of refraction of the bi-convex lens 32 and the plano-concave lens 34, and the distance between the third convex surface 36 and the concave surface 40.

In optics, aberration is defined as any disturbance of the rays of a pencil of light such that they can no longer be brought to a sharp focus or form a clear image. Accordingly, as it pertains to the instant disclosure, the light exiting the fourth convex surface 38 of the projection lens 18 can be considered as having an aberration when it is not collimated, i.e., does not project a sharp or crisp illuminated field and/or has a halo around the illuminated field. In accordance with one or more non-limiting exemplary embodiments of the system 10 of the instant disclosure, the aberration in the light exiting the fourth convex surface 38 of the projection lens 18 can be adjusted in substantially the same manner as that described for adjusting the extent of the collimation, i.e., the extent of the sharpness of the illuminated field and/or the extent of the halo therearound.

In some embodiments, the light source 14 is disposed within the housing 12 on the common optical axis 50 and facing the first planar surface 24 of the first set of lenses 16. In certain embodiments, a distance between the light source 14 and the first planar surface 24 of the first set of lenses 16 is substantially fixed and not adjustable. In some embodiments, the light source 14 and the first focal point of the first set of lenses 16 are substantially coincident with each other. In certain embodiments, the distance between the light source 14 and the first set of lenses 16, i.e., the first planar surface 24, is adjustable along the common optical axis 50. As such, the distance between the light source 14 and the first focal point of the first set of lenses is also adjustable. Consequently, the sharpness of the illuminated field of the collimated light exiting the projection lens 18, i.e., exiting the fourth convex surface 38, and/or the extent of a halo therearound will be adjustable.

In accordance with a non-limiting exemplary embodiment, the system 10 will project a collimated light for which the extent of the sharpness of the illuminated field and/or the extent of the halo therearound can be adjusted. In certain embodiments, such as those wherein the distance between the system 10 and the target changes, such adjustability of the illuminated field is desirable. In a non-limiting exemplary embodiment, wherein the light source 14 is fixedly disposed at the first focal point of the first set of lenses 16, the sharpness of the illuminated field and/or the extent of the halo therearound is adjustable by projecting the collimated light onto the target and then adjusting the distance 46 between the aperture 23 of the first set of lenses 16 and the substantially planar surface 42 of the projection lens 18. More specifically, the sharpness of the illuminated field and/or the extent of the halo therearound is adjustable by adjusting the distance between the second focal point of the first set of lenses 16 and the third focal point of the projection lens 18.

In addition thereto, or in the alternative, wherein the distance between the first set of lenses 16 and the light source 14 is adjustable, the sharpness of the illuminated field and/or the extent of the halo therearound is additionally, or alternatively, adjustable by changing the distance between the aperture 23 of the first set of lenses 16 and the light source 14. More specifically, the extent of the collimation is additionally, or alternatively, adjustable by changing the distance between the first focal point of the first set of lenses 16 and the light source 14.

In particular, the light exiting the projection lens 18, i.e., exiting the fourth convex surface 38, will be relatively more collimated having a relatively sharper illuminated field with minimal halo when both: (i) the distance between the first substantially planar surface 24 and the light source 14 is adjusted such that the first focal point of the first set of lenses 16 and the light source 14 are substantially coincident with each other, and (ii) the distance between the second substantially planar surface 28 and the projection lens 18, i.e., the third substantially planar surface 42, is adjusted such that the second focal point of the first set of lenses 16 and the third focal point of the projection lens 18 are substantially coincident with each other. In contrast, when the first focal point of the first set of lenses 16 and the light source 14 do not coincide with each other, the light exiting the projection lens 18 will be relatively less collimated with a relatively less sharper illuminated field having a halo therearound. Likewise, when the second focal point of the first set of lenses 16 and the third focal point of the projection lens 18 do not coincide with each other, the light exiting the projection lens 18 will be relatively less collimated with a relatively less sharper illuminated field having a halo therearound. It will be apparent to one skilled in the art, that the light exiting the projection lens 18 will be least collimated when: (i) both the light source 14 and the first focal point of the first set of lenses 16 do not coincide; and (ii) the second focal point of the first set of lenses 16 and the third focal point of the projection lens 18 do not coincide. Accordingly, the system 10 is configured for projecting a collimated beam of light wherein the sharpness of the illuminated field and/or the halo therearound can be adjusted. It will be apparent that such functionality is useful when the distance between the system 10 and the target changes.

In an exemplary embodiment of a method of projecting a collimated beam of light, adjusting the sharpness of the illuminated field and/or the extent of the halo therearound will include the steps of projecting the light exiting the projection lens 18, i.e., exiting the fourth convex surface 38, onto the target and then adjusting the distance between the first set of lenses 16 and the light source 14 and/or adjusting the distance between the first set of lenses 16 and the projection lens 18. More specifically, the extent of the collimation is adjusted by adjusting the distance between the first focal point of the first set of lenses 16 and the light source 14 and/or adjusting the distance between the second focal point of the first set of lenses and the third focal point of the projection lens 18.

Figure 3:
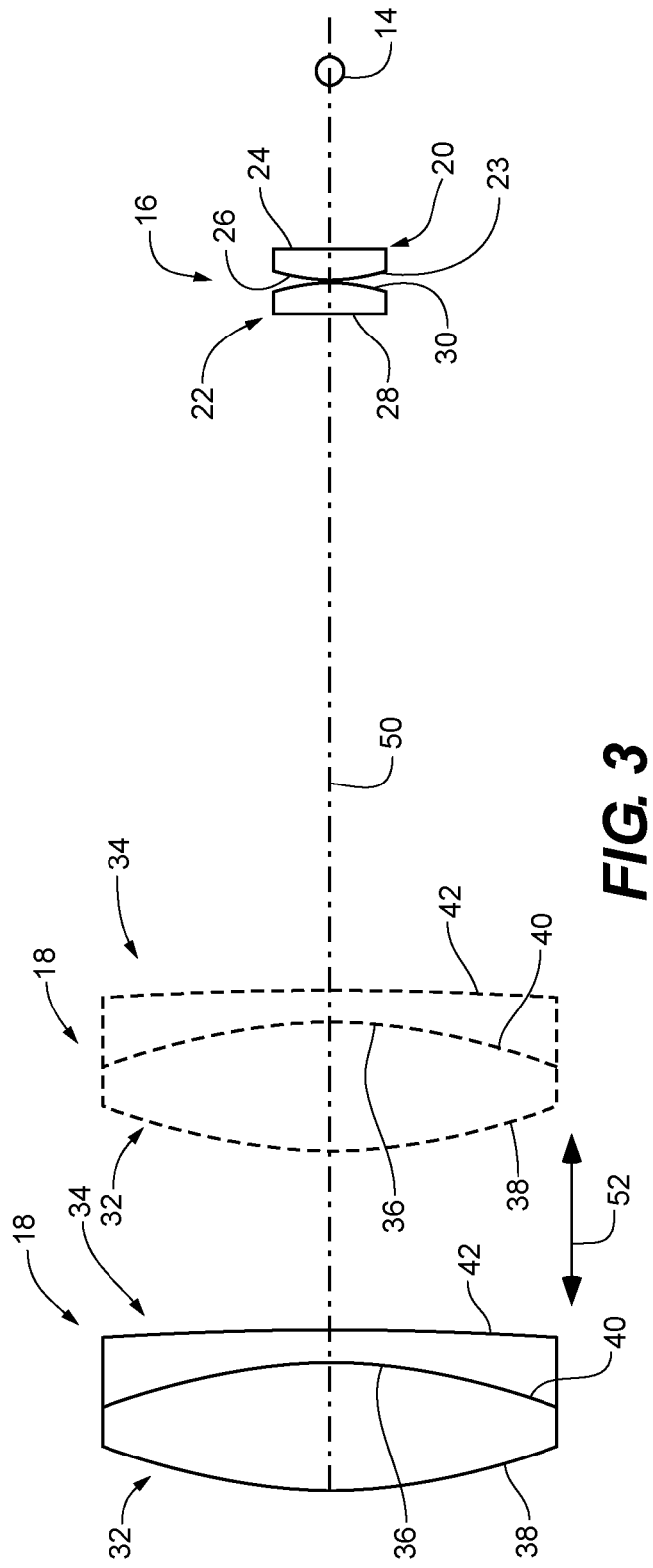
FIG. 3 illustrates the displacement of one of the key elements relative to the other key elements in the system of FIG. 1.

FIG. 3 illustrates a non-limiting exemplary embodiment wherein the collimation is adjusted by translating the projection lens 18 towards or away from the first set of lenses 16 along the common optical axis 50 as indicated by the arrows 52. In other words, the collimation is adjusted by translating the second focal point of the first set of lenses 16 and the third focal point of the projection lens 18 towards or away from each other. In the embodiment illustrated in FIG. 3, the light source 14 and the first focal point of the first set of lenses 16 are substantially coincident and the distance therebetween is not adjustable. In certain embodiments, the distance between the light source 14 and the first focal point of the first set of lenses 16 is also adjustable.

Figure 4:
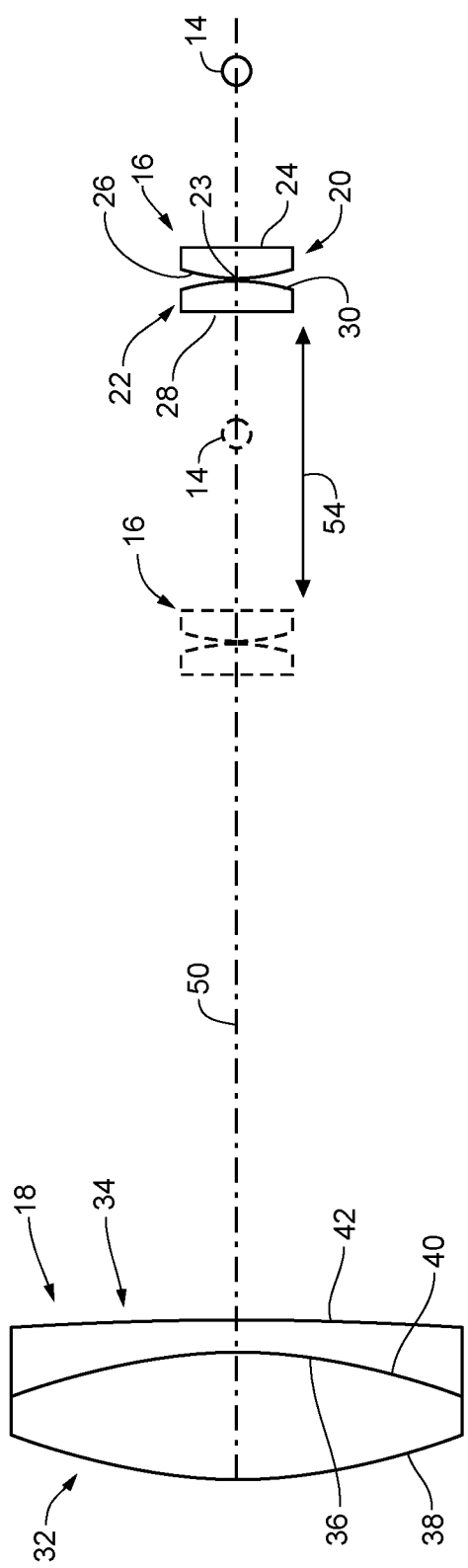
FIG. 4 illustrates the displacement of a set of key elements relative to the other key element in the system of FIG. 1.

FIG. 4 illustrates a non-limiting exemplary embodiment wherein the collimation is adjusted by translating the first set of lenses 16 towards or away from the projection lens 18 along the common optical axis 50 as indicated by the arrows 54. In other words, the collimation is adjusted by translating the second focal point of the first set of lenses 16 and the third focal point of the projection lens 18 towards or away from each other. In the embodiment illustrated in FIG. 4, the light source 14 and the first focal point of the first set of lenses 16 are substantially coincident and the distance therebetween is not adjustable. In certain embodiments, the distance between the light source 14 and the first focal point of the first set of lenses 16 is also adjustable.

Figure 5:
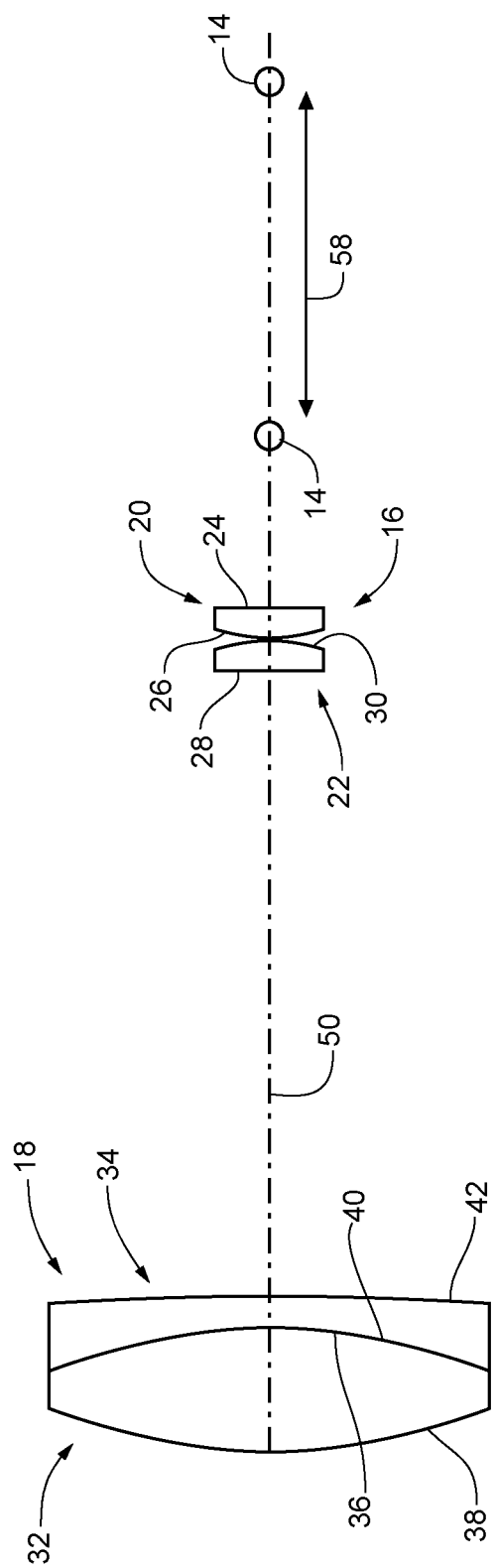
FIG. 5 illustrates the displacement of another one of the key elements relative to the other key elements in the system of FIG. 1.

FIG. 5 illustrates a non-limiting exemplary embodiment wherein the collimation is adjusted by translating the light source 14 towards or away from the first set of lenses 16 along the common optical axis 50 as indicated by the arrows 58. In other words, the collimation is adjusted by translating the light source 14 and the first focal point of the first set of lenses 16 towards or away from each other. In the embodiment illustrated in FIG. 5, the first set of lenses 16 and the projection lens 18 are fixedly disposed within the housing 12 and the distance therebetween is not adjustable. In other words, the second focal point of the first set of lenses 16 and the third focal point of the projection lens 18 are substantially coincident with each other and the distance therebetween is not adjustable. In certain embodiments, the distance between the first set of lenses 16 and the projection lens 18 is also adjustable. In other words, the distance between the second focal point of the first set of lenses 16 and the third focal point of the projection lens 18 is also be adjustable.

In view thereof, it will be readily apparent that the extent of the collimation of the beam of light projected by the various embodiments of the system 10 can be adjusted (or effectuated) by adjusting the relative positioning or locations of the light source 14, the first set of lenses 16, and the projection lens 18 either singularly or combinatorially. For instance, in some embodiments, two of the three elements or components may be fixedly positioned relative to each other and the distance between the third element component and the two fixedly positioned components may be adjustable. In certain embodiments, one of the three elements or components may be fixedly positioned and the positions of the other two elements or components may be adjustable either individually or in combination relative to each other and/or relative to the fixedly positioned element or component. As can be seen, an embodiment of the system 10 wherein the positioning of the three elements or components is adjustable relative to each other has a relatively higher degree of freedom for effectuating the collimation, i.e., the extent of the sharpness of the illuminated field and the extent of the halo therearound. It should be apparent that such degree of freedom for effectuating the collimation can be further increased in an embodiment wherein the distance between the first and the second convex surfaces 26 and 30 of the first set of lenses 16 can be adjusted and/or the distance between the third convex surface 36 and the concave surface 40 of the projection lens 18 can be adjusted. In accordance with optical theory, the degree of freedom for adjusting the collimation can also be effectuated by manipulating the indices of refraction of the one or more lenses 20, 22, 32 and 34. In some embodiments, the degree of freedom for adjusting the collimation can also be effectuated by the type or form of the light source 14. All such embodiments and/or variations thereof are considered as being within the metes and bounds of the instant disclosure.

Figure 6A:
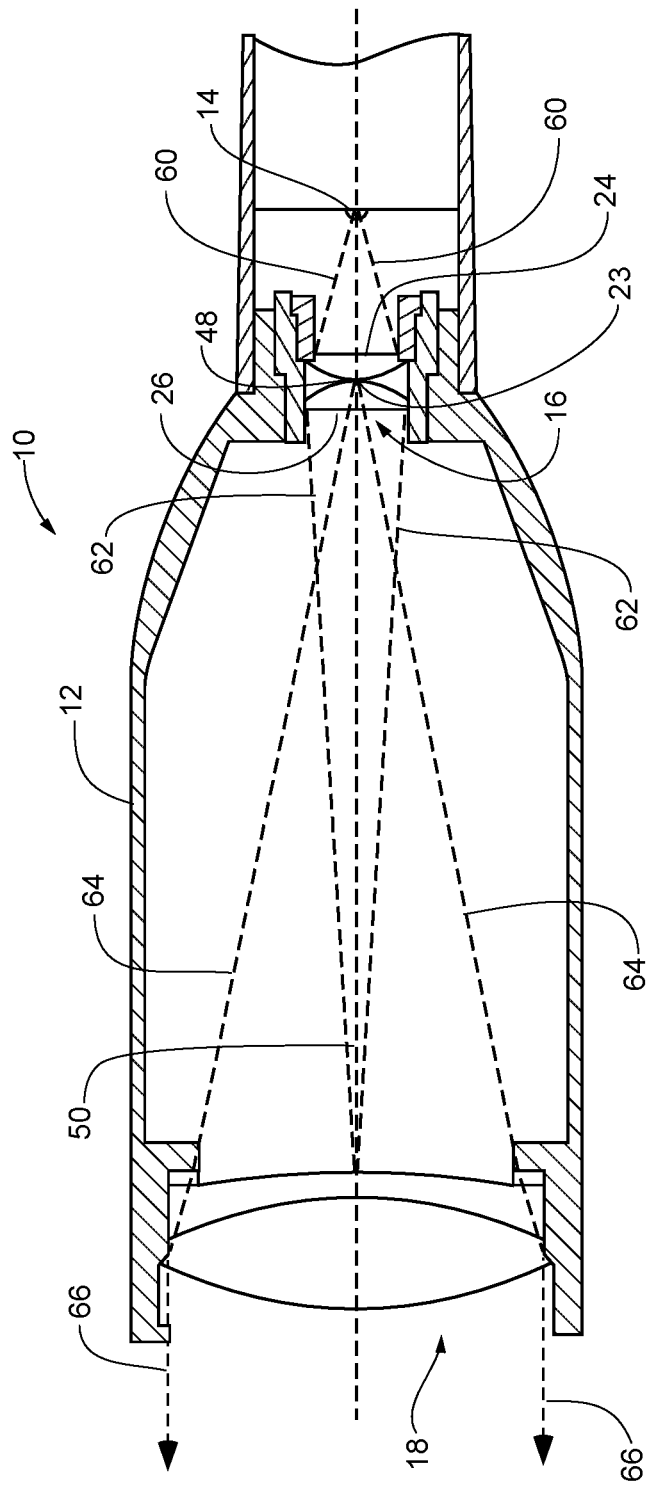
FIG. 6A is a non-limiting exemplary illustration of the optical path in an embodiment of the system of FIG. 1.
Figure 6B:
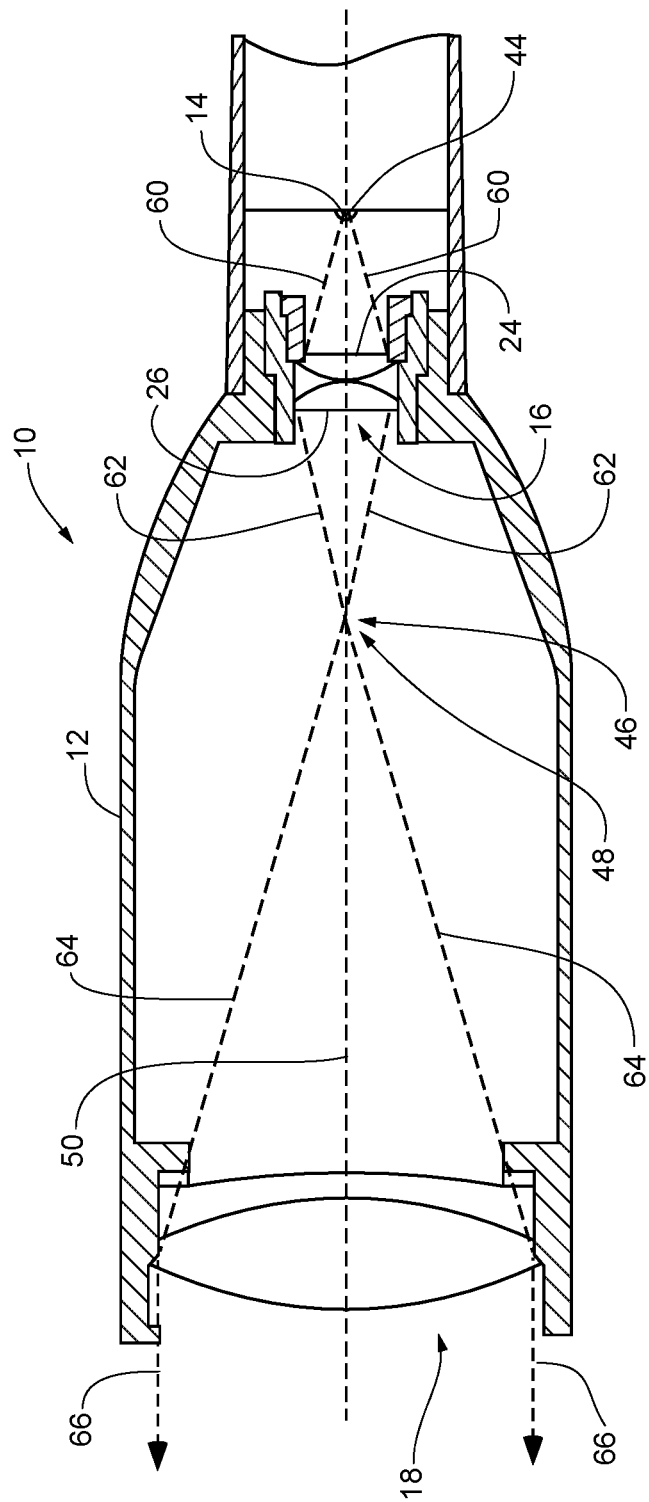
FIG. 6B is another non-limiting exemplary illustration of the optical path in an embodiment of the system of FIG. 1.

FIGS. 6A and 6B are non-limiting exemplary illustrations of the optical or light paths in an embodiment of the system 10. The following description of the illustration and the accompanying discussion will be well-known to a person having ordinary skill in the art of optics. For discussion purposes, the light source 14, the first set of lenses 16 and the projection lens 18 are substantially aligned along the common optical axis 50. As illustrated, the first and the second convex surfaces 26 and 30 are in contact with each other at their respective vertices. Furthermore, the light source 14 is fixedly positioned proximate the first focal point of the first set of lenses 16 and facing the first substantially planar surface 24 of the first plano-convex lens 20, i.e., facing the first set of lenses 16. Also, the first set of lenses 16 and the projection lens 18 are fixedly positioned relative to each other. In some embodiments, such as that illustrated in FIG. 6A, the third focal point of the projection lens 18 is located on the optical axis 50 at the aperture 23 of the first set of lenses 16. In certain embodiments, the second focal point of the first set of lenses is located on the optical axis at the surface of the third substantially planar surface 42 of the projection lens 18. In some embodiments, such as that illustrated in FIG. 6B, the second focal point of the first set of lenses 16 and the third focal point of the projection lens 18 are substantially coincident.

Also for discussion purposes, and for the sake of simplicity, the light source 14 is illustrated as a point light source having a substantially conical discharge or distribution of light 60. Light 60, from the light source 14, entering the first plano-convex lens 20 through the first substantially planar surface 24 is discharged as substantially parallel beams through the first convex surface 26 onto the second convex surface 30 of the second plano-convex lens 22. Light entering the second convex surface 30 exits through the second substantially planar surface 28 as light 62 having a substantially conical distribution. The light 62 is substantially concentrated or focused onto the second focal point of the first set of lenses 16. In certain embodiments, such as that illustrated in FIG. 6A, the light 62 is substantially concentrated or focused on the optical axis 50 at the surface of the third substantially planar surface 42 of the projection lens 18. In some embodiments, such as that illustrated in FIG. 6B, the light 62 is substantially concentrated or focused onto the substantially coincident second focal point of the first set of lenses 16 and the third focal point of the projection lens 18. The concentrated or focused light at the substantially coincident second focal point of the first set of lenses 16 and the third focal point of the projection lens 18 operates as a point light source having a substantially conical discharge or distribution of light 64 directed towards the projection lens 18. The light 64 enters the projection lens 18 through the third substantially planar surface 42 and exits through the projection lens 18, i.e., through the fourth convex surface 38, as a substantially collimated beam 66.

As stated, the light source 14 is considered as a point source having a substantially conical distribution such that all the light discharged from the light source 14 will be directed towards the first set of lenses 16. However, in practical terms, this may not always be the case. Accordingly, in a non-limiting exemplary embodiment, the first set of lenses 16 provide a means for converting light from the light source 14 into a point light source located at the second focal point of the first set of lenses 16. It will be apparent to one skilled in the art that the indices of refraction of the first and the second plano-convex lenses 20 and 22 can be manipulated to ensure a substantially point source of light at the second focal point of the first set of lenses 16 directed towards the projection lens 18.

In addition thereto or in the alternative, a reflective surface can be used to "capture" and re-direct "stray" light, i.e., light that misses the first set of lenses 16, towards the first set of lenses 16. Some such non-limiting exemplary embodiments are illustrated and described herein below with there being no intent, implied or otherwise, to limit the extent of the embodiments to those illustrated and described. Any enhancements and/or alternatives of the described and illustrated embodiments are considered to be within the metes and bounds of the instant disclosure.

Figure 7B:
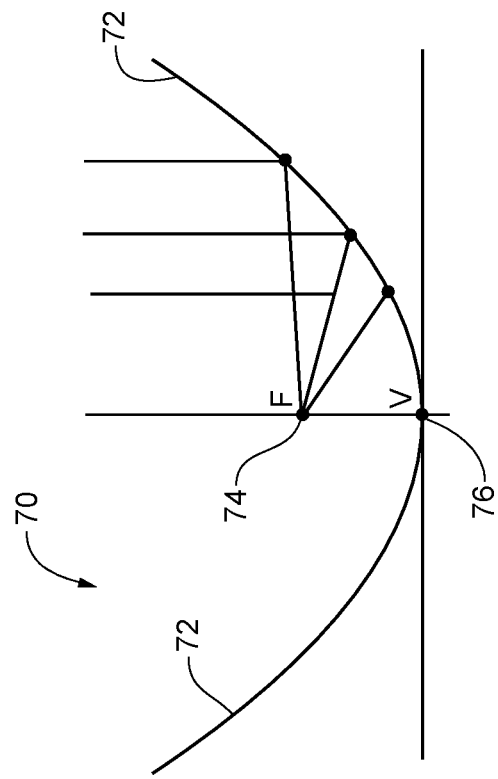
FIG. 7B is a non-limiting exemplary illustration of the optical paths for the quadratic surface illustrated in FIG. 7A.
Figure 7A:
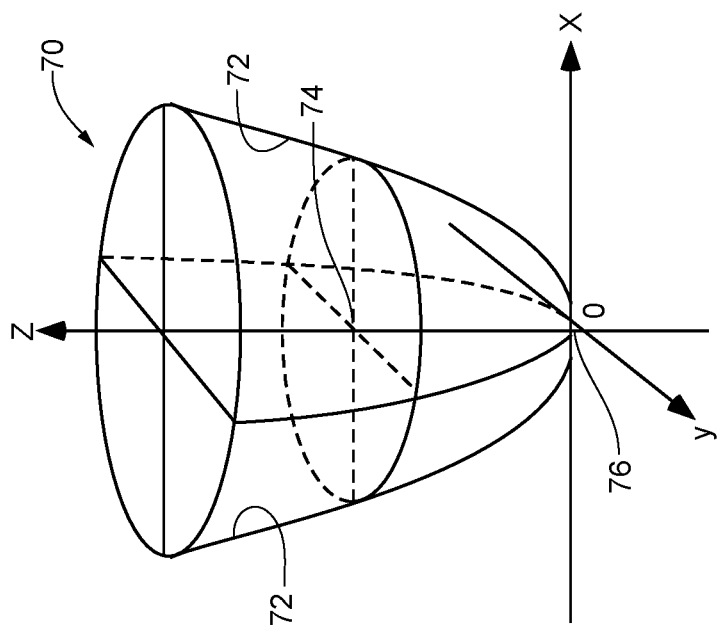
FIG. 7A illustrates a quadratic surface, e.g., a paraboloid, included in a non-limiting exemplary embodiment of a system for projecting a collimated beam.

FIGS. 7A and 7B illustrate a non-limiting exemplary embodiment of a quadratic surface 70, e.g., a paraboloid, having an interior reflective surface 72 that can be used for enhancing the collimation of the beam exiting the projection lens 18. In some embodiments, this can be accomplished by surrounding the light source 14 with the reflective interior surface 72 facing the first set of lenses 16 and having the common optical axis 50 extending through both the focal point 74 and the vertex 76 of the quadratic surface 70. In certain embodiments, the focal point 74 will be relatively closer to, and the vertex 76 will be relatively farther from, the first set of lenses 16. In some embodiments, the light source 14 is positioned at the focal point 74 and facing the first set of lenses 16. In certain embodiments, the light source 14 is positioned at the focal point 74 and facing the vertex 76. In some embodiments, the light source 14 positioned at the focal point 74 is substantially spherical such that light is emitted spherically. In certain embodiments, the light source 14 is positioned proximate the vertex 76 of the quadratic surface 70 and facing the first set of lenses 16. In some embodiments, the light source 14 is positioned anywhere along the common optical axis 50 and facing the first set of lenses 16.

In some embodiments, the collimation can be enhanced by surrounding the light source 14 with the reflective interior surface 72 facing opposite the first set of lenses 16 and having the common optical axis 50 extending through both the focal point 74 and an opening at the vertex 76 of the quadratic surface 70. In certain embodiments, the opening at the vertex 76 will be relatively closer to, and the focal point 74 will be relatively farther from, the first set of lenses 16. In some embodiments, the light source 14 is positioned at the focal point 74 and facing the first set of lenses 16 through the opening at the vertex 76. In certain embodiments, the light source 14 is positioned at the focal point 74 and facing away from the opening at the vertex 76, i.e., facing away the first set of lenses 16. In some embodiments, the light source 14 positioned at the focal point 74 is substantially spherical such that light is emitted spherically. In certain embodiments, the light source 14 is positioned on the common optical axis 50 at a location farther away from the first set of lenses 16 than the focal point 74 and facing first set of lenses 16. In some embodiments, the light source 14 is positioned anywhere along the common optical axis 50 and facing the first set of lenses 16.

In some non-limiting exemplary embodiments wherein the quadratic surface 70 is used for enhancing the collimation in the aforedescribed manner, the first set of lenses 16 may include only the second plano-convex lens 22, i.e., the first plano-convex lens 20 may not be provided. Such a configuration may be appropriate, for instance, when the light reflected from the reflective interior surface 72 is substantially parallel. Alternatively, or additionally, one or both of the first plano-convex lenses 20 and 22 may be replaced by a different type of lens. Furthermore, all non-limiting exemplary embodiments wherein the distances between the one or more elements or components, i.e., the one or more distances between the light source 14, the first set of lenses 16, the projection lens 18, the first and second plano-convex lenses 20 and 22, the bi-convex lens 32, and the plano-concave lens 34, can be adjusted are considered as being the metes and bounds of the instant disclosure. Likewise, non-limiting exemplary embodiments having different configurations for the first set of lenses 16 and/or for the projection lens 18 are also considered as being within the metes and bounds of the instant disclosure.

Figure 8A:
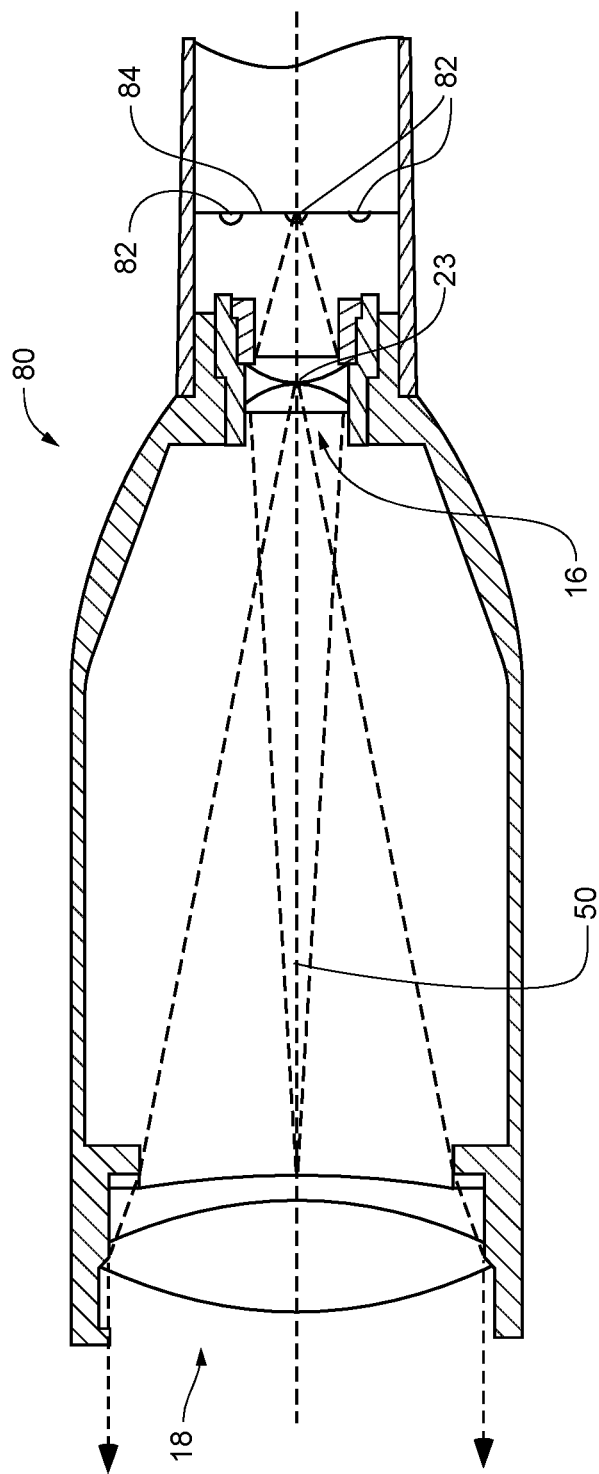
FIG. 8A is a non-limiting exemplary illustration of the optical paths in a non-limiting exemplary embodiment of a system for projecting a collimated beam of light using more than one light source.
Figure 8B:
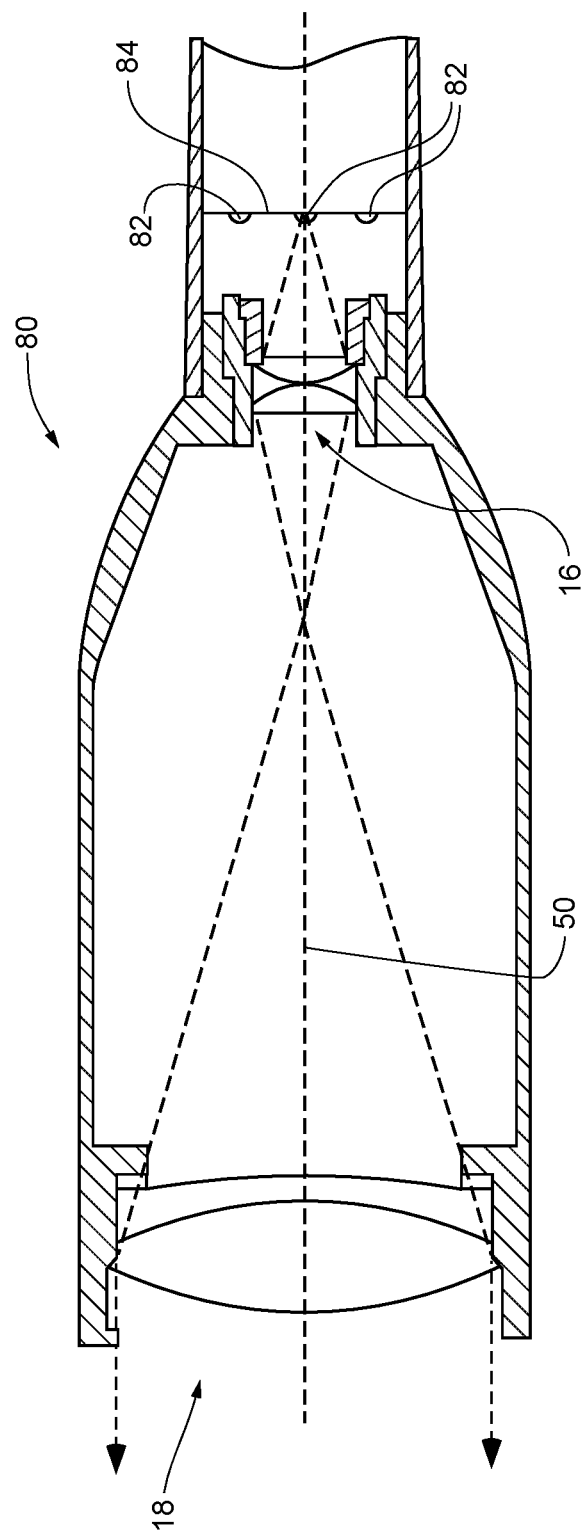
FIG. 8B is another non-limiting exemplary illustration of the optical paths in a non-limiting exemplary embodiment of a system for projecting a collimated beam of light using more than one light source.

FIGS. 8A and 8B illustrate non-limiting exemplary embodiments of the optical paths in a non-limiting exemplary embodiment of a system 80 for projecting a collimated beam of light using two or more spaced apart light sources 82. In some embodiments, the two or more light sources 82 are not spaced apart. It will be appreciated that the functional and operational characteristics of the embodiments described elsewhere with reference to the single light source 14 are equally applicable for non-limiting exemplary embodiments having the two or more spaced apart light sources 82. As with the light source 14, the two or more light sources 82 may be an LED, a laser, a filament or any combination thereof.

In some embodiments, the two or more light sources are co-planar along a common plane 84. In certain embodiments, the plane 84 is orthogonal to the common optical axis 50. In some embodiments, the plane 84 is not orthogonal to the common optical axis 50. In certain embodiments, the two or more light sources 82 are not co-planar. In some embodiments, though not illustrated, the two or more light sources 82 may be located on a reflective or a partially reflective or a non-reflective quadratic surface facing towards or away from the first set of lenses 16 and having the common optical axis 50 extending through the focus and the vertex of the quadratic surface. In some embodiments, the quadratic surface is the inside surface of a paraboloid. In certain embodiments, the two or more light sources 82 are disposed on the quadratic surface circumscribing the focal point. In other words, the two or more light sources are disposed along the quadratic surface at the location whereat a plane extending through the focal point and orthogonal to the common optical axis 50 intersects the quadratic surface. In some embodiments, the two or more light sources 82 are disposed along or on a plane extending through the focal point of the quadratic surface and orthogonal to the common optical axis 50. In some non-limiting exemplary embodiments, the first set of lenses 16 may include only the second plano-convex lens 22, i.e., the first plano-convex lens 20 may not be necessary. In some embodiments, one or both of the first and the second plano-convex lenses 20 and 22 may be replaced by a different type of lens. In certain embodiments, the first set of lenses 16 and/or the projection lens 18 may be configured differently from that described herein. In certain embodiments, the first set of lenses 16 may be replaced by a single refractive element either with or without one or more aspherical surfaces. In some embodiments, the projection lens 18 may be replaced by a single-element or multi-element (e.g., three or more) lens either with or without one or more aspherical surfaces.

In some non-limiting exemplary embodiments, a sliding mechanism or configuration is provided for the translational movement of the light source 14, the first set of lenses 16 and the projection lens 18 relative to one another. For instance, in certain non-limiting exemplary embodiments, the sliding mechanism or configuration may be similar to that in an adjustable telephoto lens wherein sliding translational movement of one element or a set of elements relative to one or more other elements or sets of elements changes the magnification of the lens. Additionally or alternatively, similar sliding mechanism or configuration may be used for changing the distance between the first and the second plano-convex lenses 20 and 22 and/or the distance between the bi-convex and the plano-concave lenses 32 and 34.

In some non-limiting exemplary embodiments, a rotating mechanism or configuration is provided for the movement of the light source 14, the first set of lenses 16 and the projection lens 18 relative to one another. For instance, in certain embodiments, the rotating mechanism or configuration may include two or more threaded or geared components wherein rotational movement of one element or sets of elements relative to one or more of the other elements or sets of elements changes the distance(s) therebetween. Additionally or alternatively, similar rotating mechanism or configuration may be used for changing the distance between the first and the second plano-convex lenses 20 and 22 and/or the distance between the bi-convex and the plano-concave lenses 32 and 34.

In some non-limiting exemplary embodiment, a combination of the sliding and rotating mechanism or configuration may be provided for changing the distance(s) between the one or more elements or sets of elements.

Figure 9:
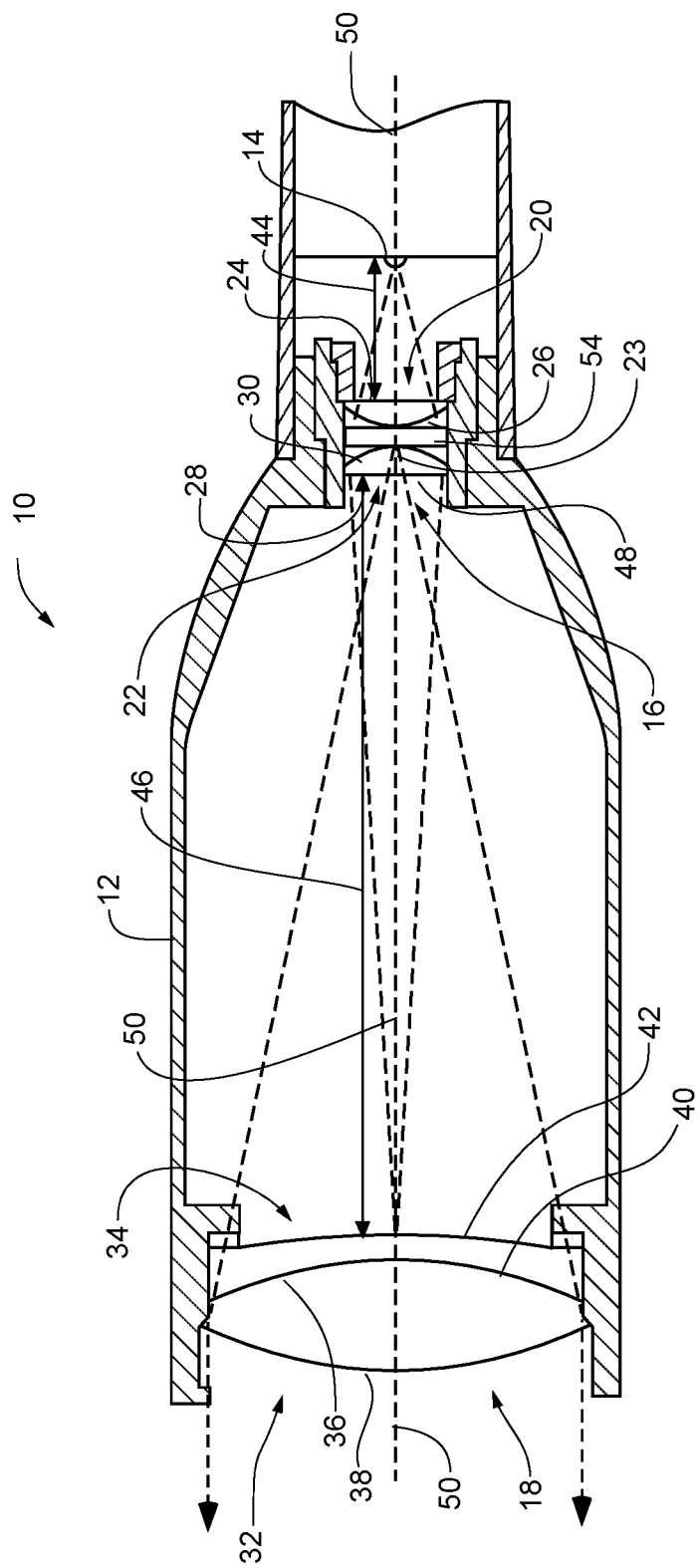
FIG. 9 is a non-limiting exemplary embodiment of a system having a targeting aid for projecting a collimated beam of light and an image of the targeting aid.

FIG. 9 illustrates a non-limiting exemplary embodiment of the system 10 having a targeting aid 100. While not illustrated, some embodiments of the system 80 may also include the targeting aid 100. In some embodiments, the targeting aid 100 is placed at the aperture 23 of the first set of lenses 16, i.e., between the first and second convex surfaces 26 and 30. In certain embodiments, the targeting aid 100 is substantially thin so as to not space apart the first and second convex surfaces 26 and 30. In some embodiments, the targeting aid 100 has a thickness. In some embodiments, the targeting aid 100 may be placed between the first set of lenses 16 and the projection lens 18. In some embodiments, the targeting aid 100 may be placed proximate the fourth convex surface 38 of the projection lens 18. In certain embodiments, the targeting aid 100 may be integral with the housing of the systems 10 and 80. In some embodiments, the targeting aid 100 may be external of the housing of the systems 10 and 80. In certain embodiments, the targeting aid 100 may be fixedly disposed. In some embodiments, the targeting aid 100 may be removably disposed. In certain embodiments, the targeting aid 100 is a projection or a virtual targeting aid 100.

In certain embodiments, the collimated beam of light projected by the systems 10 and 80 will include a projection of the targeting aid 100. In other words, the targeting aid 100 will also be projected onto the target. In some embodiments, the projected targeting aid 100 will be substantially well-defined when the targeting aid 100 and the third focal point of the projection lens 18 are substantially coincident.

In a non-limiting exemplary embodiment, the targeting aid 100 is a reticle as is well known in the art. In some embodiments, the targeting aid 100 is disposed with its center substantially aligned with the common optical axis 50.

In a non-limiting exemplary embodiment of the systems 10 and 80, such as the system 10 illustrated in FIG. 9, the light source 14, the first set of lenses 16 and the projection lens 18 are substantially aligned along the common optical axis 50. As illustrated, the first and second convex surfaces 26 and 30 are spaced apart from each other at their respective vertices by the targeting aid 100 disposed at the aperture 23 of the first set of lenses 16. In some embodiments, the projection lens 18 is used to project a collimated image of the targeting aid 100 onto a target. In some embodiments, the extent of the collimation or "sharpness" of the projected image of the targeting aid 100 is pre-set or pre-determined and fixed, i.e., extent of the collimation or "sharpness" cannot be adjusted or changed. In certain embodiments, this is accomplished by retaining the targeting aid 100 proximate the third focal point of the projection lens 18. In other words, the distance 46 between the targeting aid 100 retained at the aperture 23 of the first set of lenses 16 and the third substantially planar surface 42 of the projection lens 18 is substantially fixed and not adjustable. In some embodiments, the extent of the collimation or "sharpness" of the projected image of the targeting aid 100 is adjustable by translating the projection lens 18 towards or away from the first set of lenses 16, i.e., towards or away from the targeting aid 100 retained at the aperture 23, along the common optical axis 50 as indicated by the arrows 52. In other words, the collimation or the "sharpness" of the projected image of the targeting aid 100 can be adjusted by changing the distance 46 between the targeting aid 100 retained at the aperture 23 of the first set of lenses 16 and the third substantially planar surface 42 of the projection lens 18. It will be apparent to one skilled in the art that changing the distance 46 is substantively equivalent to translating the third focal point of the projection lens 18 towards or away from the targeting aid 100 retained at the aperture 23 of the first set of lenses 16. In certain embodiments, the light source 14 and the first set of lenses 16 are fixedly disposed relative to each other and the distance 44 between the light source 14 and the aperture 23 of the first set of lenses 16 is not adjustable. In some embodiments, as described elsewhere herein, the distance 44 between the light source 14 and the aperture 23 of the first set of lenses 16 is adjustable.

In view thereof, additional or alternate configurations of the embodiments illustrated and described herein may become apparent or obvious to one of ordinary skill. All such configurations are considered as being within the metes and bounds of the instant disclosure. For instance, while reference may have been made to particular feature(s) and/or function(s) and/or characteristics, the disclosure is considered to also include embodiments configured for functioning and/or providing functionalities similar to those disclosed herein with reference to the accompanying drawings. Accordingly, the spirit, scope and intent of the instant disclosure is to embrace all such variations. Consequently, the metes and bounds of the disclosure is solely defined by the appended claims and any and all equivalents thereof.

What is claimed is:

1. A system, comprising:
    a housing;
    a first set of lenses disposed within the housing, comprising:
        a first plano-convex lens comprising a first substantially planar surface and a first convex surface; and
        a second plano-convex lens comprising a second substantially planar surface and a second convex surface;
        wherein, the first and the second convex surfaces face each other;
    a projection lens disposed within the housing, comprising:
        a plano-concave lens comprising a third substantially planar surface and a concave surface; and
        a bi-convex lens comprising a third and a fourth convex surface;
        wherein, the concave surface and the third convex surface face each other;
    a light source disposed within the housing facing the first substantially planar surface; and
    an energy source for the light source.

2. The system of claim 1, wherein the first and the second convex surfaces are spaced apart along a common optical axis.

3. The system of claim 2, wherein a distance between the first and the second convex surfaces is adjustable.

4. The system of claim 1, wherein the first and the second convex surfaces are in with contact each other at their respective vertices.

5. The system of claim 1, wherein the first and the second plano-convex lenses comprise substantially similar indices of refraction.

6. The system of claim 1, wherein the first and the second plano-convex lenses comprise dissimilar indices of refraction.

7. The system of claim 1, wherein the projection lens is an achromatic doublet.

8. The system of claim 1, wherein the plano-concave lens and the bi-convex lens are spaced apart along a common optical axis.

9. The system of claim 8, wherein a distance between the plano-concave lens and bi-convex lens is adjustable.

10. The system of claim 1, wherein the third convex surface and the concave surface are affixed to each other along a common optical axis.

11. The system of claim 1, wherein the plano-concave lens and the bi-convex lens comprise substantially similar indices of refraction.

12. The system of claim 1, wherein the plano-concave lens and the bi-convex lens comprise dissimilar indices of refraction.

13. The system of claim 1, wherein the third substantially planar surface is convex.

14. The system of claim 1, wherein a distance between the first set of lenses and the projection lens is adjustable along a common optical axis.

15. The system of claim 1, wherein
    the first set of lenses comprises:
        a first focal point defining a first focal length; and
        a second focal point defining a second focal length; and
    the projection lens comprises a third focal point defining a third focal length;
    wherein, the first, the second, and the third focal points are substantially aligned along a common optical axis.

16. The system of claim 15, wherein the second focal point and the third focal point are substantially coincident on the common optical axis.

17. The system of claim 15, wherein a distance between the first focal point and the light source is adjustable along the common optical axis.

18. The system of claim 17, wherein the first focal point and the light source are substantially coincident on the common optical axis.

19. The system of claim 15, wherein the second focal point is on the common optical axis at the third substantially planar surface.

20. The system of claim 19, wherein the third focal point is on a common optical axis at the aperture.

21. The system of claim 15, comprising an aperture defined at least in part by the first set of lenses.

22. The system of claim 15, wherein light from the light source exiting the projection lens is substantially collimated.

23. The system of claim 22, wherein:
the first set of lenses, the projection lens and the light source are substantially aligned along a common optical axis; and
an extent to which the light exiting the projection lens is collimated is adjustable by changing one or more of:
a distance between the light source and the first focal point;
a distance between the light source and an aperture defined at least in part by the first set of lenses;
a distance between the second and the third focal points;
a distance between the second focal point and the third substantially planar surface;
a distance between the third focal point and the aperture;
a distance between the first and the second plano-convex lenses; and
a distance between the plano-concave lens and the bi-convex lens.

24. The system of claim 15, wherein an aberration in light from the light source exiting the projection lens is adjustable.

25. The system of claim 1, wherein the light source is selected from the group consisting of: a light emitting diode (LED), a laser beam, a diffused laser beam, and a filament.

26. The system of claim 25, wherein:
the first set of lenses, the projection lens and the light source are substantially aligned along a common optical axis; and
the aberration is adjustable by changing one or more of:
a distance between the light source and the first focal point;
a distance between the light source and an aperture defined at least in part by the first set of lenses;
a distance between the second and the third focal points;
a distance between the second focal point and the third substantially planar surface;
a distance between the third focal point and the aperture;
a distance between the first and the second plano-convex lenses; and
a distance between the plano-concave lens and the bi-convex lens.

27. The system of claim 1, comprising a reticle.

28. A method of collimating light from a light source, comprising:
providing a system comprising:
a first set of lenses, comprising:
a first plano-convex lens comprising a first substantially planar surface and a first convex surface; and
a second plano-convex lens comprising a second substantially planar surface and a second convex surface;
wherein, the first and the second convex surfaces face each other;
a projection lens comprising:
a plano-concave lens comprising a third substantially planar surface and a concave surface; and
a bi-convex lens comprising a third and a fourth convex surface;
wherein, the concave surface and the third convex surface face each other;
a light source; and
an energy source for the light source;
wherein,
the second plano-convex lens and the projection lens are disposed with their respective substantially planar surface facing each other;
the light source is disposed facing the first substantially planar surface; and
the first and the second plano-convex lenses, the projection lens, and the light source are substantially aligned along a common optical axis;
energizing the light source;
projecting the light from the light source exiting the projection lens onto a target; and
adjusting a distance between one or more of:
the first plano-convex lens and the light source;
the light source and an aperture defined at least in part by the first set of lenses;
the first and the second plano-convex lenses;
the plano-concave lens and the bi-convex lens; and
projection lens and the aperture.

29. The method of claim 28,
wherein,
the first set of lenses comprises a first and a second focal point; and
the projection lens comprises a third focal point;
the method comprising:
positioning the light source proximate the first focal point; and
positioning the second and the third focal points proximate each other.

30. The method of claim 29, comprising fixedly positioning at least one of the distance between the first plano-convex lens and the light source, and the distance between the second plano-convex lens and the doublet.

31. The method of claim 28, comprising adjusting a distance between the convex surfaces of the first and the second plano-convex lenses.

* * * * *